Nov. 7, 1967   LE ROY E. SCHULZE   3,351,519
PREPARATION OF PURIFIED VEGETABLE FIBERS
Filed Jan. 21, 1965   4 Sheets-Sheet 1

INVENTOR.
LEROY E. SCHULZE
BY
Moore, White + Beard
ATTORNEYS

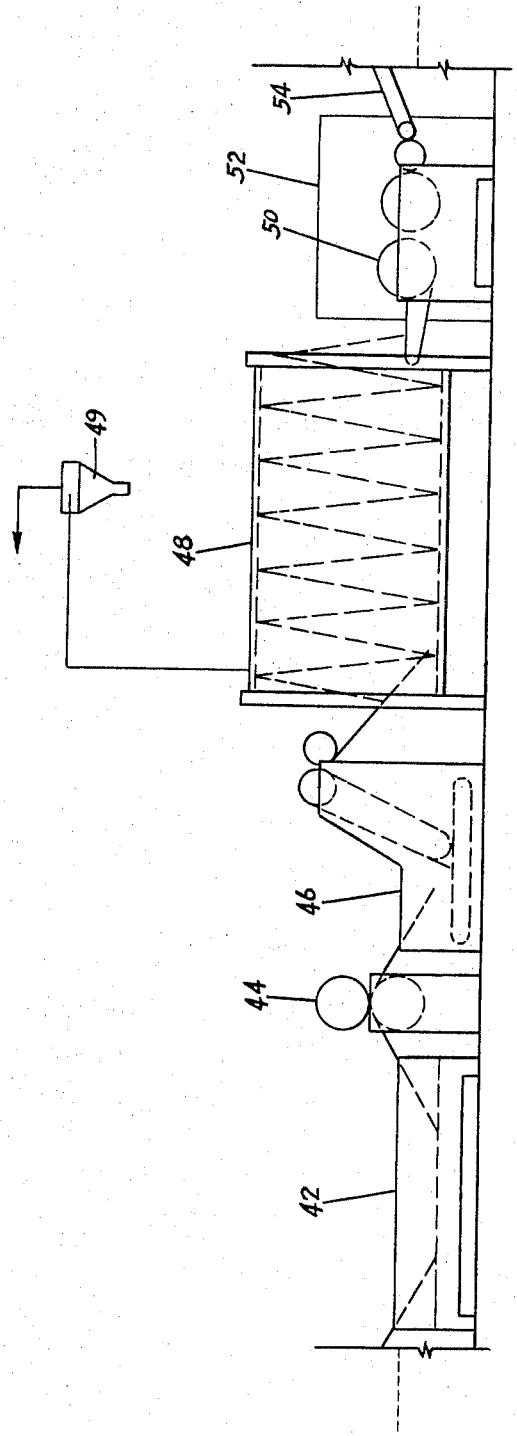

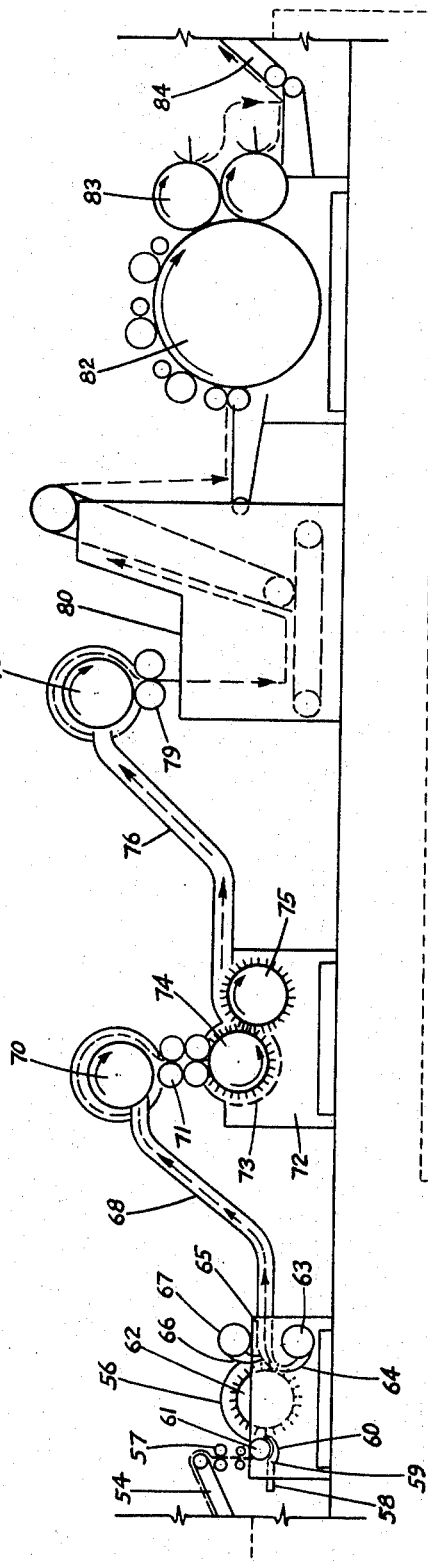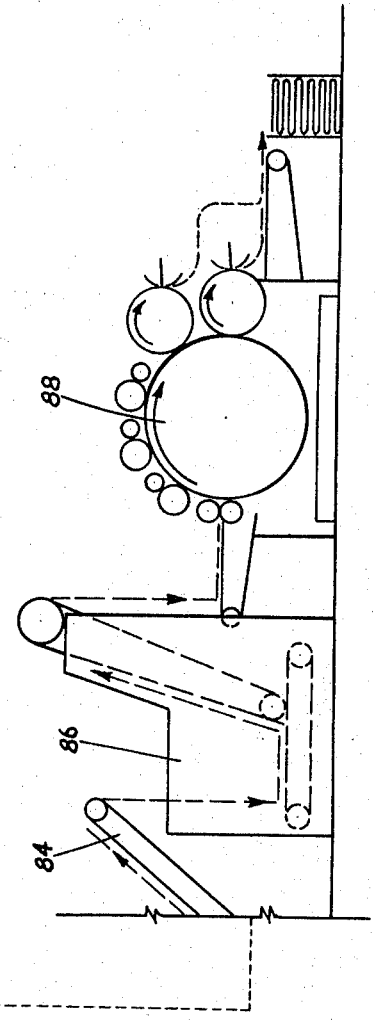

United States Patent Office 3,351,519
Patented Nov. 7, 1967

3,351,519
PREPARATION OF PURIFIED
VEGETABLE FIBERS
Le Roy E. Schulze, 710 Midland Bank Bldg.,
Minneapolis, Minn. 55401
Filed Jan. 21, 1965, Ser. No. 426,786
20 Claims. (Cl. 162—17)

ABSTRACT OF THE DISCLOSURE

A process for extracting clean undegraded virgin linen fibers, free from shive and other contaminants, from seed flax straw by a series of steps including mechanical working of the straw and mechanical opening of the fiber bundles, followed by mild hot aqueous treatments, at least one of which is caustic, partial drying, further mechanical working and final drying.

---

Figure 1:
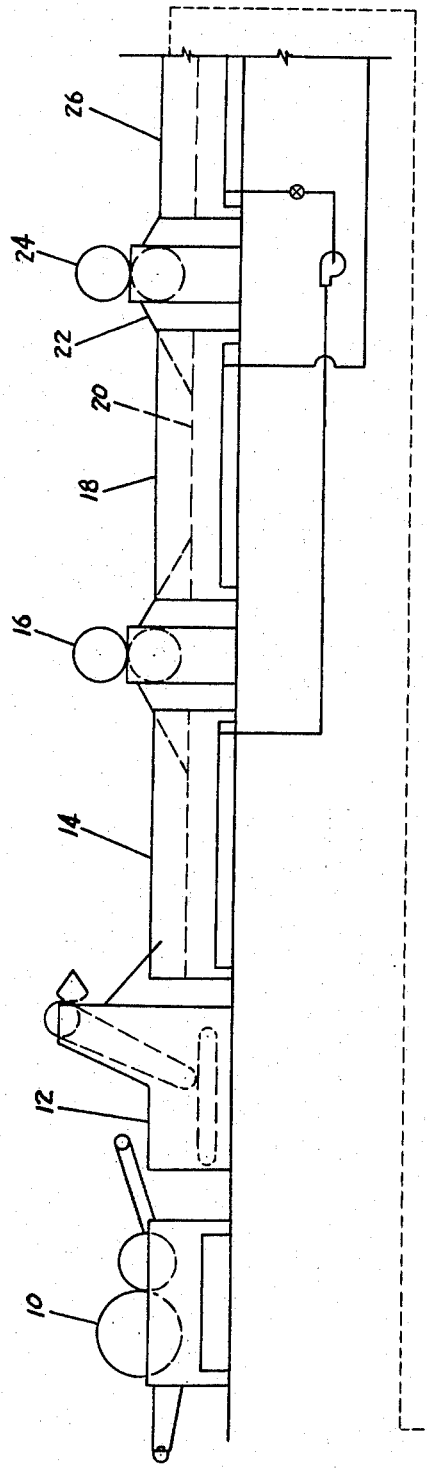
Figure 1A:
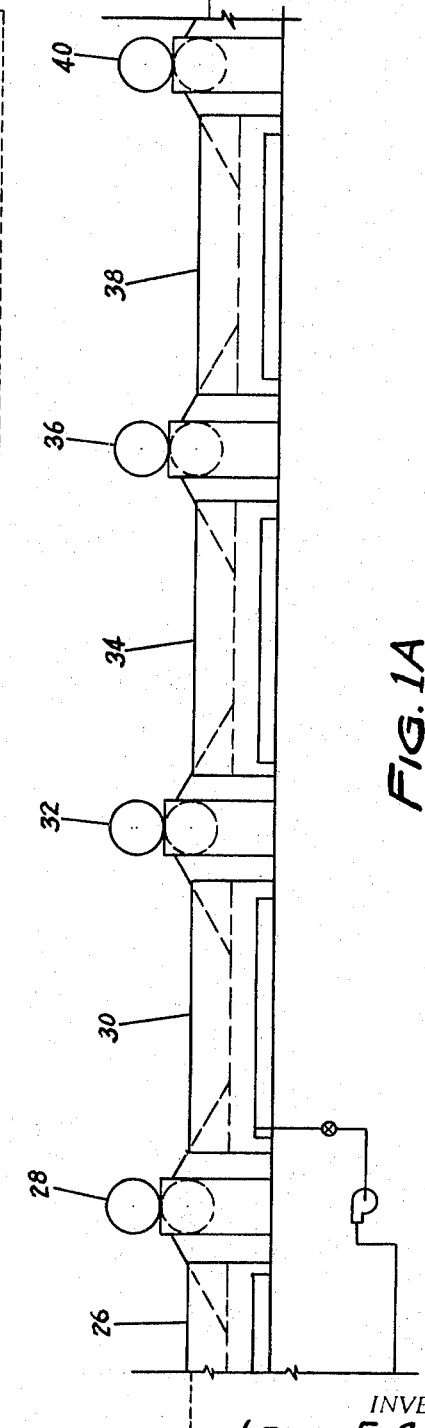

This invention relates to a method for liberating and extracting purified undegraded virgin vegetable fibers. More particularly, the invention relates to a process of freeing the fibers of mature, field-ripened seed flax straw in clean undegraded condition for textile use, both woven and non-woven; paper making; fibrous reinforcement and filler; as a source of cellulose; and similar uses.

The utilization of seed flax straw has been the subject of investigations by both private and public agencies for many years. It is estimated that in the United States and Canada each year, after harvesting of the flax crop for recovery of its linseed oil and linseed meal values, there remains more than one and one-half million tons of flax straw. A small amount of this straw is gathered and used for manufacturing of cigarette paper and other specialty papers and most of the remainder is a waste product, much of which is burned or plowed under.

The principal objectives of investigators in this field have been: (1) to find a profitable use for an agricultural by-product which is now largely wasted; (2) to relieve a scarcity of linen rags used in paper making which develops periodically and at times is critical; (3) to provide new paper making materials; and (4) to provide a new source of textile linen. Heretofore, these objectives have not been attained.

As early as 1908 the Bureau of Plant Industry of the United States Department of Agriculture began studies on the pulping of fibrous plants for paper making. Although after a period of years a satisfactory substitute for linen rags and good samples of paper were produced on a laboratory scale it was impossible to convert the small scale experiments to commercially feasible methods. The work of the Bureau of Plant Industry was later transferred to the Forest Products Laboratory of the Department of Agriculture, and still later in about 1940 this work on agricultural residues was transferred to the Northern Regional Laboratory of U.S.D.A. where it has continued to the present time, with most recent emphasis on new fibrous crops which may be suited to growing in surplus crop areas. Although much additional government sponsored investigative work has been carried out, the results have been negative from an economic standpoint.

Seed flax is grown primarily for linseed oil production and the flax plant is bred so as to promote disease resistance and maximum seed production. The seed flax plants are preferably short, sturdy, multiple branched plants with numerous seed bolls. Heavy, coarse stems are desirable to support the heavy seed bolls and to prevent lodging. Seed flax plants are allowed to grow to the full maturity of the seed, with the result that the fibers of the straw become harsh and coarse, and even some polymerization of the contained oils may result from the drying out of the stems, making the problem of separation of fibers the more difficult. Because of thorough ripening, the straw becomes brittle and less susceptible to bacterial decompositions and, in general, separation of the fibers is difficult.

Flax straw is made up of a pulpy cellulosic core surrounded by a thin layer of bast fibers and covered by a woody cortex, all bound together with various sugars, pectins, gums, and like mucilagenous materials. From about 15 to 20 percent of the flax straw is bast fiber, which is the desired recoverable product. The bundles of bast fibers as they occur in the stem are composed of from about 8 to 20 individual fibers which (if cross-sectioned) lay like shingles with one overlapping the other, the entire bundle being bound together with pectins, gums, waxes, etc. In seed flax the ultimate fibers are considered to be about one inch or more in length, which is comparable to the ultimate fibers of fiber flax when these ultimates are released from their binding gums etc., by the tedious handling of fiber flax in the usual linen process involving retting, cleaning, carding, spinning, and final boiling either in the "rove" or in the "rope" of fabric as is now common practice. From 70 to 75 percent of the straw is woody and shivey, pulpy and fibrous material which must be substantially completely removed from the bast fibers before they are useful for textile use, quality paper making, etc. The remaining material, which amounts to ten percent or less of the weight of the straw, offers little difficulty in removal either in a field weathering treatment or during the process of digestion.

The bast fibers in bundles consist of relatively pure cellulose bound together with the gums, pectins, waxes, oils and sugars (or hemi-celluloses) with some small percentage of a ligneous material, making for a complexity of requirements in obtaining a successful treatment for their removal. Present textile use of fiber flax bast fibers is based upon maintaining the fibers in bundle lengths from about 4 to 10 inches or more, and grade, as well as price, is set on these long fiber bundles being straight, clean and strong. Such care in handling to maintain these long fiber bundles has, of course, been one of the determining factors in the high costs of fiber flax (linen) on the world markets.

In the manufacture of paper products retention of fiber length is of little concern, since preparation of paper pulp leads to extreme shortening of fibers to permit better drainage on the wire of the paper making machine. Quality papers made from linen rags, or in some instances from purified fiber flax wastes (or in a minor degree from some seed flax fiber as prepared for cigarette papers, etc.), obtain their outstanding strength from the known high strength of bast fibers, their ability to cross-bond and by the retention of fiber lengths somewhat greater than lengths found in wood fibers.

Degradation of the fiber by unnecessary digestion of the cellulose due to harsh cooking conditions or high temperatures is to be avoided since it weakens the fibers and reduces the strength and character of the paper. Such severe digestion has in the past necessarily been resorted to in order to pulp the stem ends and shive particles adhering to or mixed with the linen fibers or flax straw decorticated by existing techniques. This has been one of the primary reasons for the failure to achieve a satisfactorily economic process for the extraction and utilization of seed flax fibers.

It is one principal object of this invention to obviate these prior difficulties by providing an economical process by which clean, bleached, undegraded virgin linen fibers from seed flax straw are extracted and freed from the shive and other contaminants of the flax straw.

Another object of this invention is to produce a fine textile fiber, suitable for use alone or as a blend with cotton or other fibers in the manufacture of yarn or in the manufacture of nonwoven sheet material.

A further object is to produce a clean, unbleached, undegraded virgin fiber for end uses where bleaching to a brightness level is not required, such as in yarn or fabric used as reinforcing in tires, belting, reinforced plastics, cellulose sponges, dyed unwoven fabrics and the like.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention these being indicative, however, of but a few of the various ways in which the principles of the invention may be employed.

Figure 2:
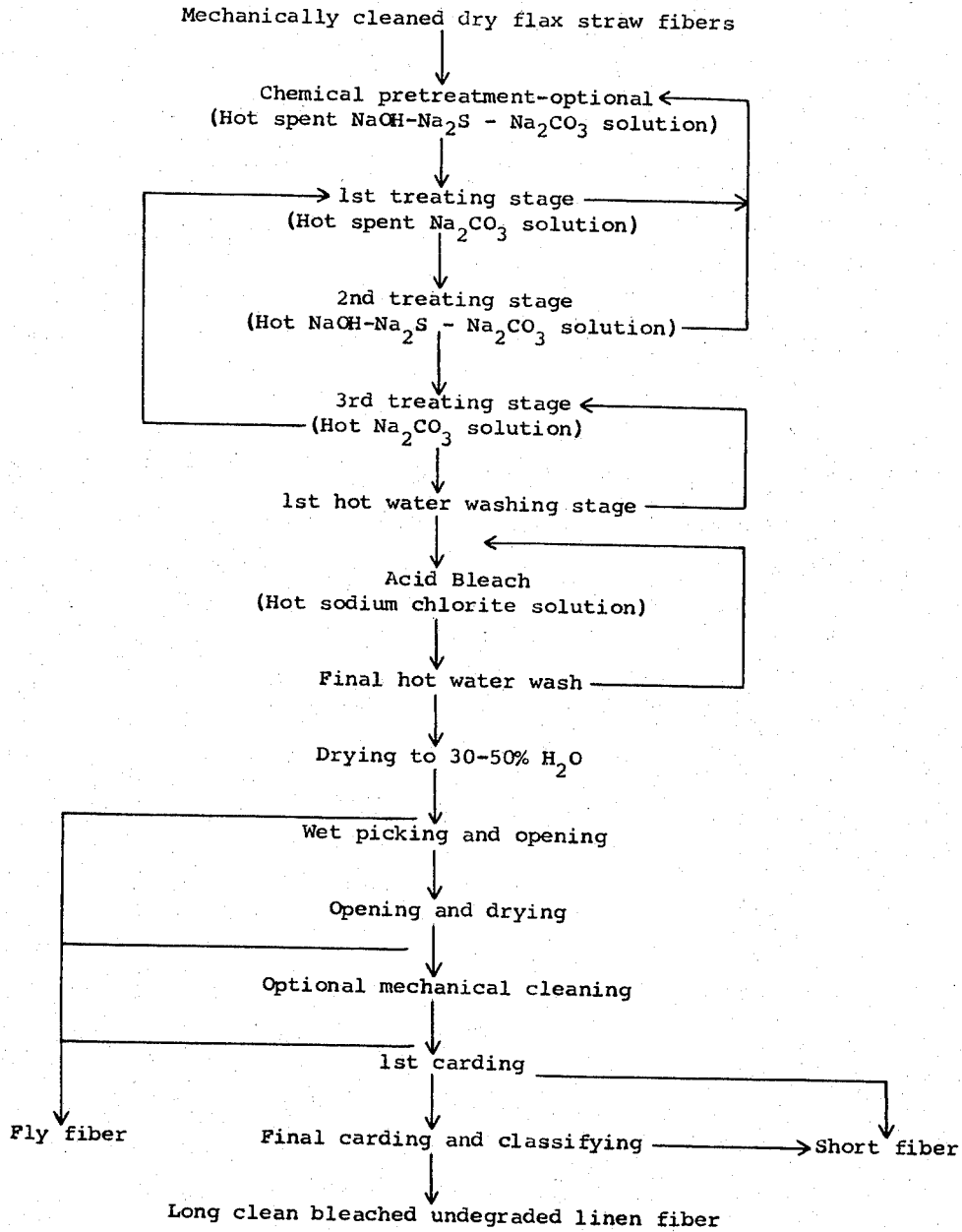

The invention is illustrated by the accompanying drawings in which the same numerals refer to corresponding parts and in which:

FIGURE 1 is a flow line chart showing schematically the processing apparatus and treatments at the beginning of the treatment method according to this invention;

FIGURES 1A, 1B, 1C and 1D in series are a continuation of the flow chart showing schematically the remainder of the process; and FIGURE 2 is a flow sheet outlining the treating steps according to the present invention.

In some instances the initial preparatory mechanical separation and cleaning of flax straw has been successfully facilitated by pretreating or conditioning the straw left after harvesting by subjecting it to a field weathering treatment in accordance with the teachings of my earlier United States Patent No. 2,741,894. However, this is not always practical because of the vicissitudes of the weather, loss of straw due to being beaten or pressed into the soil by heavy snows or torrents of rain and the like.

Seed flax is customarily mowed and laid in swaths or condensed windrows with the heads of the grain upward and left for several days to dry before threshing. Seed flax can be harvested as a standing crop, but a windrowed, well dried crop usually produces better threshing conditions. The dried flax is then usually harvested by combining. A drawn or self-propelled combine moves across the field, gathers up the swaths of dried grain, separates the seeds from the straw, deposits the seed in a grain bin, and discards the straw in a continuous stream onto the stubble of the field. The flax straw is then usually baled for storage or shipment to the processing plant. The straw is usually compressed into bales of either round or rectangular cross-section by pick-up balers which make bales weighing from about 40 to 60 pounds.

In some instances it may be desirable to subject the straw to a braking treatment in the field for the purpose of reducing the bulk of material which must be handled. Braking consists of a mechanical manipulation of the straw to loosen and separate some of the shivey material from the bast fibers. It is accomplished usually by passing the straw between pairs of corrugated rollers which work the straw and tend to break up the harder woody material.

Upon delivery at the processing plant or delivery from storage the bales of seed flax straw are introduced to a high capacity bale breaking and feeding unit (such as, for example a Taylor-Stiles bale breaker). The purpose of the bale breaker is simply to open up the bale and loosen up the straw from its dense compacted condition in the bale.

A preferred dry mechanical cleaning process is described in my earlier United States Patent No. 2,957,209. According to the process of that patent the straw is mechanically worked to initiate opening thereof and separation of shive from the straw fiber. This mechanically worked straw is then subjected to a plurality of successive flailing beating actions to further open the straw and dislodge shive particles from the fibers. The straw is flailed in a cotton lint cleaner apparatus, as described in U.S. Patents Nos. 2,418,694 and Re. 23,044. The repeated flailing beating action of stripper bars of the lint cleaner against straw fibers carried past them by a saw cylinder causes a further opening and breaking of the straw and dislodging of shive from the straw fibers. The mechanically cleaned dry fibers are then separated from the dislodged shive particles, usually by permitting the shive to separate by gravity while wafting the cleaned fibers from the lint cleaner in an air stream to a condenser where the gas is separated. The mechanically cleaned dry flax straw fibers, such as produced by the process of my earlier patent, 2,957,209, are the starting material for the final cleaning and bleaching process according to the present invention.

While the mechanical cleaning process of my aforesaid earlier patent is the best known method of producing clean seed flax straw fiber, and the only known way of doing so economically, the process of the present invention is not necessarily so limited. Small quantities of comparable clean fiber from both seed flax straw and fiber flax straw can be produced by other methods which require much manual handling and constant individual attention with resulting slowness, tediousness and high cost which renders such preparation economically unfeasible.

According to the present invention, mechanically cleaned dry flax straw fiber is subjected to a further cleaning and extraction treatment in an initial "wet phase" for the purpose of freeing the fiber of easily extracted contaminants, the binding gums, pectins, waxes, oils, sugars, etc., and thus liberating the shive particles still adhering to the fiber, but with relatively little change being made in the shive particles themselves. The objective is to produce clean bright purified linen fiber in its virgin undegraded state, freed from the woody and other non-fiber constituents of the original straw. This finishing treatment according to the present invention is carried out gently under mild conditions so as to avoid degradation of the bast fibers of the straw and to maintain maximum fiber length. In this regard, the present process is to be contrasted with pulping and digestion processes of the prior art in which the composition and properties of the bast fibers themselves are altered and the fibers are degraded in the attempt to remove the shive by digesting or pluping. Heretofore, this was regarded as an undesirable but unavoidable evil attendant upon the processing of flax straw in an attempt to recover its values.

According to the present invention, the starting material is mechanically cleaned, dry flax straw fiber. In some instances, depending upon the condition of this mechanically cleaned straw, it may be desirable to subject it to some additional opening and throw-out of shive particles by passing the fiber through a shredder or garnett 10. Depending upon the initial condition of the cleaned fiber, the shive remaining in the mechanically cleaned fiber, which varies with growing and harvesting conditions, may be about 3% of the mechanically cleaned fiber. The mechanical opening in the shredder or garnett may cull out further amounts of this shive, reducing the shive to about 1 to 2% by weight. At the same time, the fiber bundles are opened further to expose greater surface area of the individual fibers for treatment. A small amount of broken dry fiber may be lost as a result of this further opening. This optional step may desirably be omitted, except when the initial condition of the fiber indicates that further mechanical cleaning and opening will facilitate the wet phase treatment.

If the mechanically cleaned straw fibers are subjected to the wet phase treatment immediately following the dry phase mechanical cleaning, then the fibers are already in the form of a loose mat or web and may be passed into the shredder or garnett 10 in this condition. However, if the wet phase treatment is carried out at a different time or at a different site and the cleaned straw fiber is in bale form, then, of course, the bale must be opened and pulled apart so that the fibers may be treated in the form of a relatively thin loose web which moves as a stream through the processing apparatus.

It must at all times be kept in mind that flax is a natural vegetable product and, therefore, varies widely. No two flax plant stems will be exactly alike. The straw will vary depending upon such factors as the variety of plant, the soil in which it is grown, the climactic conditions prevailing during the growing term, the manner in which the plants are harvested, the conditions to which the straw has been subjected after harvesting, and the like. Thus, the starting material is widely heterogeneous. The further the material progresses toward final finishing the more homogeneous it becomes.

The straw fiber is introduced into the hopper of a feeder unit 12 to even out the introduction of dry fiber. Preferably, then the dry material is passed through an optional pretreatment bowl 14 into which spent treating solution from a subsequent treating bowl or bowls is recycled so as to obtain maximum chemical action from the treating chemicals before discharging the liquors to waste. When the optional pretreatment is utilized, the stream of straw fibers is then passed through a pair of squeeze rolls 16 to extract the pretreating solution before the web of fibers is introduced to the first of several other treating bowls. Where the pretreatment is omitted the fiber is fed directly from the hopper and the feeder unit 12 into the first stage treating bowl 18.

The treating bowls 16, 18, etc., are shallow scouring bowls of the wool scouring type. Although not essential, it is desirable that they are fitted with a false bottom 20 of screening or similar open work material. This assists in segregating any solids, such as shive particles and the like, which may fall through the perforations of the open bottom and can be drained off with the liquid without loss of fiber masses. Desirably, also each scouring bowl is equipped with moving fingers mounted over the bowl to continually progress the stream of fiber with the well known rake motion at a speed determined by the strokes of the rake tines or fingers, the distance of each stroke and time interval between strokes. This same rake motion also assists in moving the stream of fiber up an incline 22 at the discharge end of the bowl to the nip of further squeeze rolls 24 which engage the fiber mass and draw it through the nip, while extracting the treating solution and returning it to the bowl.

In other instances the rake motion may be avoided by conducting the loose web of fibers through the baths while supported on a liquid permeable web. For example, the loose web of fibers may be folded into or between two felts or a loosely woven cloth.

The dry fiber will take with it as much as 100 to 300% of its own weight of the bowl liquor from the first bowl through which it passes. For this reason it is necessary that the first bowl contacted by the dry fiber be constantly replenished with liquor, whether this be the pretreatment bowl or the first treating bowl. The straw fiber moves in countercurrent flow against a flow of chemical liquors. Accordingly, the treating solution contained in the first treating bowl is a partially spent solution from one of the subsequent downstream treating bowls. This solution is maintained at near boiling temperature under atmospheric or near-atmospheric pressure. It is added at a rate to maintain the desired liquid level and hot makeup solution is added at a rate to maintain the required chemical concentration. A scouring and washing operation takes place in the first treating bowl to remove surface dust and dirt and to take off easily solubilized sugars and pectins. This makes the next treating stage more efficient by making the harder to extract materials more available for treatment.

The treating bowls, are desirably heated externally as, for example, by external gas flames, although internal heating coils may be used. Heating is thermostatically controlled so as to maintain some slight ebullition with a minimum loss of vapor. The fiber masses move through the treating bowls in a floating and open condition, as contrasted with the tumbling and tangled mass associated with the usual digestion vessel. The ebullition of the liquor imparts a kneading action upon the fiber mass and causes constant mild circulation of the liquors into contact with the fibers. This, associated with the rake motion action, insures intimate contact between each fiber bundle and the liquor to insure uniform and rapid treating results. In order to minimize liquor loss by vaporization and to maintain a constant pressure and temperature level, the work space surrounding the treating bowls may be enclosed and pressurized, although high pressures and temperatures are to be avoided as damaging to the fibers.

The fiber masses from the first treating bowl 18 pass through the squeeze rolls 24 into a second treating bowl 26 in which the fibers are subjected to a near boiling solution of composition similar to the usual kraft liquor solution. This consists of a mixture of sodium hydroxide and sodium sulphide ($Na_2S$) with sodium carbonate ($Na_2CO_3$) as a buffer. The sodium hydroxide may be present in this solution in concentration between about 0.25% to 10% or more. The sodium sulphide is present in the range between about 20 to 35% of the weight of sodium hydroxide in the solution, known as the "sulfidity ratio." The sodium carbonate is present in about the same concentration as the sodium hydroxide or slightly lesser amount. These concentrations of materials are maintained by periodic sampling and addition of makeup to replenish spent materials. The discharge from this treating bowl is circulated to the pretreatment bowl 14, where that bowl is used. Otherwise, the spent liquor may be simply discharged to waste. The liquor from this bowl is discharged at the rate of about 10 to 40 parts by weight, for each part by weight of dry fiber treated. This bath takes off the harder to extract materials which require harsher treatment for removal.

The fiber mass from the second treating bowl 26 is passed through squeeze rolls 28 and into a third treating bowl 30. This third treating bowl contains a solution of from about 0.5 to 4% or more of sodium carbonate maintained at near boiling temperature. It serves to wash off any adhering extracted contaminants from the preceding caustic and sulfide cook. The concentration is maintained by replenishment of the spent liquor by addition of heated makeup liquor as required. Desirably wash water from the first wash bowl is used in preparation of the makeup solution for maximum utilization of the chemicals. The discharge from the third treating bowl 30 is circulated to the first treating bowl 18 and there makeup solution containing about 0.5 to 10% sodium carbonate is added to maintain the desired concentration. The liquor from the third treating bowl is discharged at the rate of about 5 to 30 parts by weight for each part by weight of fiber treated.

While each of the treating stages has been described as taking place in a bowl, this is not necessarily limited to a single vessel. Instead, each of these stages may be carried out in one or more vessels. The residence time in each stage is adequate if of 5 to 10 minutes duration.

The fiber mass from the third treating bowl 30 is discharged through a further set of squeeze rolls 32 into a wash bowl 34 of clean hot water. This washing is primarily for the avoidance of alkali contamination of the subsequent acid-bleach bowl. Hot water is used in order to avoid the condensation of extractivess which occurs if cold water is used for a wash. The level of this wash bowl is maintained by admission of fresh makeup water and discharge of contaminated water in countercurrent flow to the movement of the fiber, with the discharge desirably going to the makeup of the scouring bowls.

From the wash bowl 34 the wet web or fiber is passed through further squeeze rolls 36 and enters the bleaching stage. This bleaching may be carried out in a three stage system in which the web is treated with gaseous chlorine or chlorine water, followed by caustic extraction, followed by hypochlorite treatment. However, preferably bleaching is carried out in a single corrosive resistant bowl 38 fitted with means for imparting rake motion for movement of the fiber and having an open false bottom for removal of droppings of shive particles, as already described. Particles which have been loosened in the earlier chemical solution treatments appear to become noticeably more free in the bleach bowl and readily drop from the fiber web. The bleach bowl is also desirably heated externally so as to maintain the liquor at near boiling temperature.

For simplicity and avoidance of fiber degradation the bleach bath is desirably composed of a solution of sodium chlorite ($C_2$ Textone, Olin-Mathieson Chemical Company) of concentration between about 1% and 10% having a pH in the range of about 3.5 to 7.0 and, preferably, between about 4.5 and 5.5 maintained at a temperature of about 190–210° F. Residence time in the bleaching stage may be from 5 to 20 minutes, and, preferably about 15 minutes. For best bleaching action in the shortest time with uniform brightness, a high liquor to fiber ratio of from about 40 to 60 to 1 or higher is maintained. Where maximum brightness with minimum degradation is important, this is best attained by 3-stage bleaching sequence using 2 acid bleach bowls with an intermediate alkali bowl.

From the bleach bath 38 the fiber web is passed through squeeze rolls 40 into a final wash bowl 42. This wash bowl is a clear hot wash in countercurrent flow to the movement of the fiber web. This water wash removes the traces of the acid bleach bath from the fiber. The discharge being very slightly acid may be used as makeup liquid for preparation of makeup solution for the bleach bowl, or optionally it may be sprayed over the fiber mass before it enters the bleach bowl in order to change the pH value of the fiber mass from neutral or slightly alkaline to slightly acid before it enters the acid bleach bowl. At the same time the pH of the bleach waste liquors is raised before discharge to the sewer to avoid acid pollution of the stream to which the discharge flows.

Where the end use of the clean fiber is one in which color and brightness are of lesser importance, the bleaching stage may be omitted. For example, where the fiber is to be used as reinforcement for plastic material color is usually not critical. Where the fibers are formed into non-woven sheet material for textile use and are dyed, bleaching is usually not necessary.

The fiber as it leaves the second wash bowl 42 is in the form of a loose wet matted web of bright clean bleached and undegraded bast fiber bundles and fibers of linen. It is withdrawn from the wash bowl 42 through a final set of squeeze rolls 44 and fed into the hopper of an apron type feeder unit 46 and thence into a dryer 48. The dryer 48 may be of the conventional belt or apron type passing through a tunnel and confronted with hot air, or it may be in the form of a rotating cylinder (as shown) through which the fibers pass while being rolled and agitated so as to fluff or strike the fiber masses to change the surface form presented to the hot air. The cascading action of the rotating cylinder type of dryer is preferred since it avoids excessive drying of unbroken masses of individual fibers.

Some remaining shive particles are dislodged from the fibers in the course of passage through a cascading rotating type dryer. Discharge air from the dryer is preferably conveyed to a collector unit shown schematically at 49 in order to recover all short fiber values which may have been entrained in the dryer air. This short fiber has value in paper pulp. The collector unit is desirably a "bag-sock" dust filter unit (Day Mfg. Co.) which is efficient in cleaning out "fly-fines" from an air stream to permit the air stream to be recycled. Where the present process is carried out in conjunction with the "dry phase" process of my earlier patent, the clean hot moist discharge air from the dryer is preferably recycled to those earlier processing stages where higher humidity as well as elevated temperature is desired to enhance the workability of the dry fiber.

Drying is controlled so as to avoid excessive drying. If the fiber is to be stored in bins at this point it may be dried to normal regain or about 8 to 10% moisture. However, if the fiber is to be immediately subjected to further treatment it desirably leaves the dryer with about 30 to 50% moisture based on the oven dry weight of the fiber. At this moisture content the fibers have not formed bonds with one another and can be worked into an open form without mechanical damage.

The slightly moist fiber masses from the dryer are then passed to a wet picker unit 50 (which may optionally be located in a high humidity chamber 52). This unit takes the fiber masses and picks and opens them into substantially smaller masses which then can be disposed on a moving apron 54 or a condenser drum type of collector and formed into a fairly uniform mat which is desirable as a "picker-lap" as it is called in the textile trade for feeding the next unit in the line.

This picker-lap is then passed to an opener-dryer unit 56 of special design. This opener-dryer unit 56 is based on a modified cotton lint cleaner. It comprises one or more pairs of feed rolls 57 which receive the fibers from the apron 54 from the wet picker 50 to a piano key treadle or pedal section. This section is made up of a plurality of pivoted narrow keys or pedals 58 disposed in spaced side by side relation to move on a common pivot 59 and each having a concave section 60 which is resiliently held against a revolving serrated or pinned or grooved roller 61. The lap or mat of fibers passes through the space between the concave portions of the keys and the roller 61, being thus held from a sudden plucking action by the high speed saw cylinder 62 of the opener. The saw cylinder 62 is mounted on an axis parallel to that of the roller to rotate in close proximity to the ends of the keys.

As is known, the saw cylinder 62 is composed of a plurality of closely spaced circular disks of the same diameter mounted on a common shaft. The retarding piano key action holds the small masses of fiber so as to avoid a sudden engagement with the saw cylinder and prevents heavy loading of the saw cylinder teeth. The teeth of the saw cylinders pluck small tufts of fiber out of the mat or lap. At this stage the tufts may be merely single fibers depending upon the rate of travel of the fiber mass toward the saw cylinder and the peripheral speed of the saw cylinder teeth.

Because of the relatively high moisture content of the lap and the absence of a bond between the fibers there is provided maximum "slip" of fiber upon fiber to facilitate separation. Because linen fiber has a high wet strength, its working at this point in this manner does not result in undue breakage.

Because the moist fibers may be slightly tacky when pressed by the feed rollers against the keys there may be a tendency of adhesion. To prevent this the piano key members are desirably surface coated with a substance to prevent adhesion, such as a tetrafluoroethylene polymer (Teflon). The toothed disks of the saw cylinder are spaced at intervals of from about ¼ to ½ inch. The small fibers or tufts held by the teeth of the saw cylinder are thus permitted to flare out and trail the teeth as they move in rotation. This prevents moist sticking occurring while the fiber is held by the teeth.

Hot, dry air of about 200 to 250° F. is introduced at the doffing points from the saw cylinder from a hot air duct 63 through a discharge passage 64 having a narrowing throat or nozzle end to impart a high velocity to the air stream. As seen this lower discharge passage 64 directs the high velocity air flow at the doffing point of the saw cylinder to entrain the flaring loose ends of the fibers which are then immediately projected at high velocity in the direction of the air stream. The fiber is thus doffed or removed from the teeth of the saw cylinder 62 and entrained by the air stream for passage to a condenser.

In the duct 65 formed immediately after the doffing zone additional hot dry air is introduced through a discharge channel or nozzle 66 from hot air duct 67 to blanket the air-borne fibers and thus avoid any impingement of the fiber on the duct surface. The exchange of moisture contained by the fiber to the hot dry air now proceeds at a rapid rate due to the known release of moisture from the extended surface of the porous fibers. Thus, in a short distance of travel the fiber moisture has been lowered through the critical zone where bonding of fiber to fiber occurs.

The air-borne fiber is thence passed in a stream through a conduit 68 and impinged upon the usual rotating perforated drum condenser surface 70 forming into a mat and the air is removed. The thusly formed mat is carried by the perforated surface of the condenser to a doffing roller 71 where the mat is removed to a second or third such opener dryer as desired or necessary. It is generally sufficient for one opener-dryer such as unit 56 to be used. A second unit may optionally be used and is able to handle the fiber at a moisture range of about 10 to 18% without any new bonding occurring.

From the condenser 70 the fiber mat optionally passes through the pairs of feed rollers of a lint cleaner 72. This lint cleaner may be of the type with piano key feeds and with the usual longitudinal cleaning bars 73 disposed around the periphery of the saw cylinder 74 so as to permit through put of fiber to be cleaned of some of the still remaining clinging shive particles. The fiber may be doffed from the saw cylinder 74 either by means of a brush cylinder 75 as shown, or by high velocity air nozzle form of doffing, as previously described, using either cold or hot air. The latter is desirable where a still further small drying effect is desired.

From the lint cleaner 72 the linen fibers are passed through a further air duct 76 to a perforated drum condenser 78 where the air is removed and the air-borne fiber is again formed into a mat. This fiber mat is fed through doffing rolls 79 into the hopper of a further feeder unit 80 and thence to a secondary cleaning unit 82. This may be a wool or cotton card or garnett. It takes the open and dry fiber and, with the usual carding action, further opens the small fiber bundles and at the same time throws out last remaining bits of shive particles. It presents the fiber as a very fluffy web removed by the doffing cylinders 83 and the comb. The fiber is then transported by a belt conveyor 84 to the hopper of a further feeder unit 86 and, thence, to a final card 88 which functions as a classifier unit. This unit is of the cotton card design. The precise construction and operation of the final card 88 is determined upon the end uses to be made of the fiber. The long fiber linen may be held in the card and presented as a roving from the doffer and wound into cans. The short fibers are brought to the surface of the strippers or the "flat-top" of the card and are continuously removed from the card to be compressed in a baling unit. This short fiber has value in many end uses, in non-woven fabrics, in paper pulp, in absorbent waddings, etc. All of the "fly" doffs and fibers picked up by the pneumatic cleaners of the several machines are separated and collected for use as, for example, in paper pulp.

The fiber which may be separated at the point where it is discharged from the opener-dryer unit 56, or from the subsequent optional lint cleaner unit 72, is suited for direct use in forming bonded mats of non-woven sheet material. The fiber at this point is in well opened condition. The discharge of fiber from the doffing zones of the opener-dryer unit of lint cleaner unit is quite uniform. While it may contain a small amount of shive, for many purposes this is not objectionable. Use may be made of the known bonding effects of linen fiber by the simple expedient of spraying water (or starch or other bonding solution) onto the air-borne fiber just prior to its impact upon the rotating cylinder 70 or 78 of the condensers. The water intake by the fiber when in the air stream, as well as a light water spray which could contact the fiber as it forms a mat on the perforated drum of the condenser, immediately raises the moisture content of the fiber above the bonding level. The mat may be compacted readily while holding this moisture. This mat may be removed from the cylinder surface by doctor blade means or by an inner doffing air stream. The wet mat may then be conducted directly to a take-off apron or to the nip of a drying cylinder where moisture may be removed to below the bonding zone, which occurs at about 15 to 20% moisture. This inherent natural nominal bond of the linen fibers results in a light bonded sheet of fibers which may be conveyed to a further bonding action under pressure of calender rolls or the like.

While the process of this invention has been described with particular reference to flax straw, and especially to seed flax straw, it will be apparent to those skilled in the art that the same sequence of processing steps may be economically carried out with respect to other vegetable fiber plants. For example, plants such as jute, hemp, ramie, etc. contain fiber values which are useful and desired when they can be economically obtained. It is to be understood, however, that linen fiber has unique properties. Accordingly, the characteristics of the final fiber product will vary widely depending upon the initial fiber containing material selected for treatment.

As an illustration of the results of the present process, 500 pounds of dry straw (10% moisture) from the field when mechanically cleaned according to the process of my earlier Patent 2,957,209 produces an average yield of dry mechanically cleaned fiber of 100 pounds. This 100 pounds of dry fiber, when put through the wet treating stages of the present invention as described in detail herein, produces 75 pounds of dry finished bleached fiber. This is the result of pre-treatment, initial scouring and washing, caustic and sulfide cook, final scouring and washing, bleaching and washing. Where the bleaching step is omitted the yield is approximately 83 pounds of dry finished unbleached fiber. After opening, carding and classifying of the finished bleached fiber, the final yield equals 50 pounds of long fiber, 15 pounds of short fiber, 2.5 pounds of broken fly fiber and 7.5 pounds of shive.

The particular treating chemicals set out in the detailed description of the invention are intended to be exemplary of the classes of compounds which may be used, but it should be clear that the invention is not limited to the use of these particular materials. A large number of chemical substances which may be used for pulping and digesting of vegetable matter are well known in the papermaking art. The same materials may generally be used in the present process, but under less severe processing conditions so that the action is limited to extraction of binding ingredients without digestion or pulping of the straw or straw fibers. A large number of these useful chemicals is set out in the publication of the Forest Products Laboratory entitled "Pulping and Papermaking Characteristics of Seed Flax Straw" by Schaffer and Curran, (R1159).

It is apparent that many modifications and variations of this invention as hereinbefore set forth may be made without departing from the spirit and scope thereof. The specific embodiments described are given by way of example only and the invention is limited only by the terms of the appended claims.

I claim:
1. A process for preparing purified vegetable fibers which comprises
  (A) mechanically working the dry fiber-containing stems of a vegetable plant to fracture woody constituents and dislodge and separate at least a major proportion of the woody constituents,
  (B) mechanically opening the resulting dry partially cleaned fiber bundles to expose maximum surface area of the fibers and adherent minor proportion of woody constituents and non-woody contaminants,
  (C) extracting said woody constituents and non-woody contaminants by subjecting the opened partially cleaned fibers in sequence to a plurality of mild hot aqueous extraction treating baths including
    (1) at least one caustic bath to remove water soluble and caustic soluble encrusting and contaminating substances adhering to said fibers,
    (2) said baths being maintained at below boiling temperatures under near atmospheric pressure,
  (D) separating the thusly treated wet fibers from the sequence of treating baths and from the extracted contaminants,
  (E) partially drying the wet fibers to about 30 to 50% moisture content, above the moisture level at which the fibers dry bond to one another, to permit further fiber separation.
  (F) mechanically working the partially dried fibers to pick apart and further open and separate the fibers, and
  (G) drying the opened and cleaned fibers to below about 20% moisture content, below the moisture level at which the fibers are dry bonded.

2. A process according to claim 1 further characterized in that said fibers are passed through said extraction treating baths continuously in the form of a loose web in countercurrent flow to the liquids of the treating baths.

3. A process according to claim 2 further characterized in that said mild hot aqueous extraction treating baths include an acid bleach bath to remove discoloring contaminants.

4. A process according to claim 3 further characterized in that said loose web of fibers is passed through said extraction treating baths with a gentle raking motion to assure maximum contact between fiber and liquid and the fiber is resident in each caustic bath for between about 5 and 15 minutes and in said bleach bath for between about 10 and 20 minutes.

5. A process according to claim 2 further characterized in that said loose web of fibers is passed through said treating baths while supported on at least one other liquid permeable web.

6. A process according to claim 1 further characterized in that said partially cleaned fiber is pretreated with spent solution from said caustic extraction treating bath before introduction to the first of said extraction treating baths.

7. A process according to claim 3 further characterized in that said fiber is washed in a hot water bath maintained at below boiling temperature under near atmospheric pressure subsequent to the last of said caustic treating baths and subsequent to said acid bleach bath.

8. A process according to claim 7 further characterized in that said fiber is treated with spent bleach solution from said bleach bath prior to introduction into said bleach bath to neutralize any caustic residue in said fiber mass.

9. A process according to claim 1 further characterized in that said opened and cleaned fibers are dried to below the moisture level at which the fibers are dry bonded while in the form of a loose web, whereby a natural dry bonded web of sheet material is produced.

10. A process according to claim 9 further characterized in that said opened and cleaned fibers are dried while entrained in a hot gas stream, condensed in web form by separation of the gas, remoistened while in web form and while still in web form dried to below the moisture level at which the fibers are dry bonded.

11. A process according to claim 1 further characterized in that said dry fiber containing stems of a vegetable plant is mature seed flax straw from which flax seed has been separated and recovered.

12. A process for preparing clean soft absorbent bleached linen fiber which comprises
  (A) mechanically working the dry linen fiber containing stems of mature seed flax plants from which flax seed has been separated and recovered to fracture the shive and dislodge and separate at least a major proportion of the shive,
  (B) mechanically opening the resulting dry partially cleaned fiber bundles to expose maximum surface area of the fibers and adherent shive and non-shive contaminants,
  (C) continuously extracting said shive and non-shive contaminants by subjecting the opened partially cleaned fibers in sequence in countercurrent flow to a plurality of mild hot aqueous extraction treating baths including
    (1) at least one caustic bath to remove water soluble and caustic soluble encrusting and contaminating substances adhering to said fibers and
    (2) an acid bleach bath to remove discoloring contaminants,
  said baths being maintained at below boiling temperatures under near atmospheric pressure,
  (D) separating the thusly treated wet linen fibers from the sequence of treating baths and from the extracted contaminants,
  (E) partially drying the wet linen fibers to about 30 to 50% moisture content, above the moisture level at which the fibers dry bond to one another, to permit further fiber separation,
  (F) mechanically working the partialy dried linen fibers to pick apart and further open and separate the fibers, and
  (G) drying the opened and cleaned linen fibers to below about 20% moisture content, below the moisture level at which the fibers are dry bonded.

13. A process according to claim 12 further characterized in that said loose web of fibers is passed through said extraction treating baths with a gentle raking motion to assure maximum contact between fiber and liquid and the fiber is resident in each caustic bath for between about 5 and 15 minutes and in said bleach bath for between about 10 and 20 minutes.

14. A process according to claim 12 further characterized in that said partially cleaned fiber is pretreated with spent solution from said caustic extraction treating bath before introduction, to the first of said extraction treating baths.

15. A process according to claim 12 further characterized in that said fiber is washed in a hot water bath maintained at below boiling temperature under near atmospheric pressure subsequent to the last of said caustic treating baths and subsequent to said acid bleach bath.

16. A process according to claim 15 further characterized in that said fiber is treated with spent bleach solution from said bleach bath prior to introduction into said bleach bath to neutralize any caustic residue in said fiber mass.

17. A novel clean soft bleached absorbent linen fiber produced by the process of claim 12.

18. A process according to claim 12 further characterized in that said opened and cleaned fibers are dried to below the moisture level at which the fibers are dry bonded while in the form of a loose web, whereby a natural dry bonded web of sheet material is produced.

19. A process according to claim 18 further characterized in that said opened and cleaned fibers are dried while entrained in a hot gas stream, condensed in web form by separation of the gas, remoistened while in web form and while still in web form dried to below the moisture level at which the fibers are dry bonded.

20. A novel natural dry bonded sheet of clean soft absorbent bleached linen fiber produced by the process of claim 18.

References Cited

UNITED STATES PATENTS

| | | | |
|---|---|---|---|
| 2,641,541 | 6/1953 | Wells | 162—98 |
| 2,925,626 | 2/1960 | Reider | 19—7 |

ROY B. MOFFITT, *Primary Examiner.*

J. R. HALL, *Assistant Examiner.*